US012578254B2

(12) United States Patent
Duan et al.

(10) Patent No.: US 12,578,254 B2
(45) Date of Patent: Mar. 17, 2026

(54) GRINDING SIMULATION TEST DEVICE AND METHOD FOR STEEL TURNOUT RAIL OF RAIL TRANSIT

(71) Applicants:China Academy of Machinery Wuhan Research Institute of Materials Protection Co. Ltd., Wuhan (CN); China Hubei Longzhong Laboratory, Xiangyang (CN)

(72) Inventors: Haitao Duan, Wuhan (CN); Dan Jia, Wuhan (CN); Jinhong You, Wuhan (CN); Wulin Zhang, Wuhan (CN); Shengpeng Zhan, Wuhan (CN); Yu Cheng, Wuhan (CN)

(73) Assignees: China Academy of Machinery Wuhan Research Institute of Materials Protection Co. Ltd., Wuhan (CN); China Hubei Longzhong Laboratory, Xiangyang (CN)

( * ) Notice: Subject to any disclaimer, the term of this patent is extended or adjusted under 35 U.S.C. 154(b) by 0 days.

(21) Appl. No.: 19/254,045

(22) Filed: Jun. 30, 2025

(65) Prior Publication Data

US 2026/0002853 A1     Jan. 1, 2026

(30) Foreign Application Priority Data

Jul. 1, 2024     (CN) .......................... 202410872653.2

(51) Int. Cl.
*G01N 5/04*        (2006.01)
*G01N 3/56*        (2006.01)
(52) U.S. Cl.
CPC ................. *G01N 5/04* (2013.01); *G01N 3/56* (2013.01)

(58) Field of Classification Search
CPC ................................... G01N 3/56; G01N 5/04
(Continued)

(56) References Cited

FOREIGN PATENT DOCUMENTS

CN        109813620 A   *   5/2019
CN        114923800 A   *   8/2022   ........... B24B 19/004
(Continued)

OTHER PUBLICATIONS

CNIPA, Notification of First Office Action for CN202410872653.2, Jan. 14, 2025.
(Continued)

*Primary Examiner* — Laura Martin
*Assistant Examiner* — Nashmiya S Fayyaz
(74) *Attorney, Agent, or Firm* — Hemisphere Law, PLLC

(57)        ABSTRACT
A grinding simulation test device and method for a steel turnout rail of rail transit are provided. The device includes a rotary unit, a reciprocating unit, a turnout swinging unit, and a pressurizing unit. The rotary unit includes a grinding tool rotary mechanism, a temperature monitoring mechanism and a turnout grinding tool. A movable end of the grinding tool rotary mechanism is detachably connected to the turnout grinding tool through a torque sensor, to thereby drive the turnout grinding tool to rotate and monitor a torque. The temperature monitoring mechanism is configured to monitor temperatures during a grinding process. Through the reciprocating unit, the rotary unit, the turnout swinging unit and the pressurizing unit, four main influencing parameters, namely, moving speed, rotary speed, grinding angle and grinding pressure of a grinding tool, are disassembled into four independent parameters, thereby improving controllability and operability of each single parameter under laboratory conditions.

10 Claims, 4 Drawing Sheets

(58) Field of Classification Search
USPC ................................................ 73/865.8, 7, 8
See application file for complete search history.

(56)                      References Cited

FOREIGN PATENT DOCUMENTS

| | | |
|---|---|---|
| CN | 117863036 A | 4/2024 |
| KR | 20230146911 A | 10/2023 |

OTHER PUBLICATIONS

Hubei Longzhong Laboratory & China Academy of Machinery Wuhan Research Institute of Materials Protection Co., Ltd. (Applicants), Replacement claims (allowed) of CN202410872653.2, Feb. 19, 2025.
CNIPA, Notification to grant patent right for invention in CN202410872653.2, Feb. 27, 2025.

* cited by examiner

GRINDING SIMULATION TEST DEVICE AND METHOD FOR STEEL TURNOUT RAIL OF RAIL TRANSIT

CROSS-REFERENCE TO RELATED APPLICATION

This application claims priority to Chinese Patent Application No. 202410872653.2, filed on Jul. 1, 2024, which is herein incorporated by reference in its entirety.

TECHNICAL FIELD

The disclosure relates to the technical field of steel rail grinding of rail transit, and more particularly to a grinding simulation test device and a grinding simulation test method for a steel turnout rail of rail transit.

BACKGROUND

Rail transit is an important part of a public transport system. Due to its advantages of large capacity, high speed, safety and reliability, the rail transit is regarded as a backbone of an urban transport system and has become a focus of transportation development strategies. With continuous improvement of high-speed railway construction and increasing use of high-speed heavy-haul trains, requirements for steel rail quality are constantly improving, and steel rail maintenance is facing new challenges. Due to high operating costs and time limitations of large grinding vehicles, as well as their low efficiency in complex turnout sections, medium and small-sized railway maintenance machines are commonly used in daily railway maintenance. These machines have flexibility and low cost. Among them, a grinding machine for steel rail turnout repair has been widely used in railway maintenance work regions and has become an indispensable main equipment in maintenance operations. Turnout grinding device has a mature system, but there is still no equipment for studies on grinding technologies of real steel rail turnout and on grinding performance test of a turnout grinding tool under laboratory conditions.

Operations of turnout grinding devices provided by a Chinese patent with publication No. CN220789274U, a Chinese patent with publication No. CN111926637A, and a Chinese patent with publication No. CN108396604A are realized by manual push feeding and manual loading. In a grinding process, a contact angle of a turnout grinding stone is adjusted to grind a whole rail surface of a steel turnout rail.

For the aforementioned technologies in related art, the turnout grinding devices lack experimental equipment that can quickly and conveniently detect performance of the turnout grinding tool and grinding quality of the steel turnout rail. Meanwhile, the turnout grinding devices in the related art are difficult to meet test requirements. When grinding test or performance test of the turnout grinding tool is required, it needs to be carried out in a rail transit section or a large-scale track simulation site, which not only occupies a large area of railway operation section, but also requires a long maintenance window period. Moreover, the turnout grinding devices are significantly affected by manual control, a feeding speed and a load applied by the turnout grinding tool are unstable, so that performance evaluation of the turnout grinding tool and evaluation of turnout grinding quality are significantly affected. Therefore, how to conveniently detect the performance of the turnout grinding tool and the grinding quality of the steel turnout rail and meet a need of simulation experiments in a laboratory is a technical problem to be solved.

SUMMARY

Aiming at defects in the aforementioned technologies, the disclosure provides a grinding simulation test device and a grinding simulation test method for a steel turnout rail of rail transit, to thereby solve a problem of how to conveniently detect performance of a turnout grinding tool and grinding quality of the steel turnout rail and meet a need of simulation experiments in a laboratory in related art.

To achieve the aforementioned objectives, the disclosure uses the following technical solutions.

In an aspect, the grinding simulation test device for the steel turnout rail of rail transit provided by the disclosure includes a rotary unit, a reciprocating unit, a turnout swinging unit, and a pressurizing unit.

The rotary unit includes a grinding tool rotary mechanism, a temperature monitoring mechanism and a turnout grinding tool. A movable end of the grinding tool rotary mechanism is detachably connected to the turnout grinding tool through a torque sensor, to thereby drive the turnout grinding tool to rotate and monitor a torque. The temperature monitoring mechanism is configured to monitor temperatures during a grinding process.

A movable end of the reciprocating unit is connected to the rotary unit, to thereby drive the rotary unit to feed transversely.

The turnout swinging unit is disposed opposite to the rotary unit and includes a steel rail frame and an angle adjusting mechanism. The steel rail frame is disposed on a movable end of the angle adjusting mechanism. The steel rail frame is configured to mount the steel turnout rail. The angle adjusting mechanism is configured to adjust a grinding angle of the steel turnout rail.

A movable end of the pressurizing unit is connected to the turnout swinging unit. The pressurizing unit is configured to elastically push and output a load to provide a contact force between the steel turnout rail and the turnout grinding tool and monitor the contact force.

In an embodiment, the reciprocating unit includes a first platform, a feed assembly, slide rails and sliders. The feed assembly and the slide rails are disposed on a top of the first platform. The sliders are slidably connected to the slide rails. The sliders are connected to the rotary unit. A driving end of the feed assembly is connected to the sliders to drive the sliders to slide along the slide rails.

In an embodiment, the feed assembly includes a feed rack, a feed motor and a feed gear. The feed gear is disposed on an output shaft of the feed motor. The feed gear is disposed on the top of the first platform and meshed with the feed rack. The feed motor is disposed on the sliders.

In an embodiment, the grinding simulation test device for the steel turnout rail of rail transit includes a feeding unit. The feeding unit includes a second platform, a carriage mechanism and a longitudinal feeding mechanism. The carriage mechanism is disposed on the second platform and connected to the pressurizing unit. A movable end of the longitudinal feeding mechanism is connected to the turnout swinging unit and the pressurizing unit to drive the turnout swinging unit and the pressurizing unit to feed longitudinally.

In an embodiment, the grinding simulation test device for the steel turnout rail of rail transit further includes a control unit. The control unit is electrically connected to the reciprocating unit, the rotary unit, the turnout swinging unit, the pressurizing unit and the feeding unit. The control unit is configured to receive and transmit control signals, receive data, and control a running speed of the reciprocating unit, a rotating speed of the rotary unit and a feeding speed of the pressurizing unit.

In an embodiment, the pressurizing unit includes a loading mechanism, a damping mechanism and a guiding mechanism.

The loading mechanism includes a floating joint, a servo electric cylinder and a support plate. The servo electric cylinder is disposed on the support plate. A driving rod of the servo electric cylinder is connected to the support plate and the floating joint in turn. The servo electric cylinder is configured to apply a pressure by telescopic movement of the driving rod.

The damping mechanism includes spring support frames, a damping spring, a guide rod and a pressure sensor. The spring support frames are two in quantity, and the two spring support frames are connected to the loading mechanism and the pressure sensor respectively. The guide rod is disposed in parallel with the damping spring and passes through through-holes defined on the two spring support frames.

The guiding mechanism includes a connecting seat, guide rail sliders, linear guide rails and support side plates. The connecting seat is connected to the turnout swinging unit through the pressure sensor. The linear guide rails are two in quantity, the support side plates are two in quantity, and the two linear guide rails each are disposed on a corresponding one of the two support side plates in parallel. The two support side plates are disposed on the second platform. The connecting seat is disposed on the guide rail sliders. The guide rail sliders are slidably connected to the two linear guide rails.

In an embodiment, the angle adjusting mechanism includes an adjusting assembly, a fixing assembly and a motion steering assembly.

The adjusting assembly includes steel rail frame support plates, a swinging support frame and an arc-shaped rack. The swinging support frame is connected to the steel rail frame support plates. The steel rail frame is rotatably connected to inner sides of the steel rail frame support plates. The arc-shaped rack is disposed on a top of the swinging support frame.

The fixing assembly includes a steering rod, a rack meshing block, a steering handle, a tension spring and a spring fixing block. The rack meshing block is sleeved on the steering rod. A bottom of the steering rod is connected to the spring fixing block. The steering handle is disposed on the rack meshing block. An end of the tension spring is connected to the spring fixing block, and another end of the tension spring is connected to the rack meshing block. The swinging support frame is fixed on the connecting seat. The steering rod is rotatably connected to the swinging support frame.

An input end of the motion steering assembly is connected to the steering rod, and an output end of the motion steering assembly is connected to the steel rail frame. The motion steering assembly is configured to rotate the steering rod and transmit rotation of the steering rod to the steel rail frame to thereby drive the steel rail frame to rotate.

In an embodiment, the motion steering assembly includes a first bevel gear, a bevel gear support frame, a second bevel gear, a first transmission rod, a second transmission rod and a synchronous transmission structure. The bevel gear support frame is connected to the swinging support frame. The first transmission rod and the second transmission rod pass through the bevel gear support frame. The second transmission rod is connected to the steering rod. The first bevel gear is disposed on the bevel gear support frame and meshed with the second bevel gear. An input end of the synchronous transmission structure is connected to the second bevel gear, and an output end of the synchronous transmission structure is connected to the steel rail frame. The synchronous transmission structure is configured to transmit rotation of the second bevel gear to the steel rail frame to thereby drive the steel rail frame to rotate.

In an embodiment, the synchronous transmission structure includes a first transmission gear, a third transmission rod, a synchronous belt, a fourth transmission rod and a second transmission gear. The third transmission rod passes through the steel rail frame support plates and is connected to the first transmission gear. The third transmission rod is drivingly connected to the steel rail frame to drive the steel rail frame to rotate. The second transmission gear is connected to the fourth transmission rod and is connected to the first transmission gear through the synchronous belt. The second bevel gear is disposed on the fourth transmission rod.

In another aspect, the grinding simulation test method for the steel turnout rail of rail transit provided by the disclosure and applied to any one of grinding simulation test devices for the steel turnout rail of rail transit described above, includes the following steps:

S1, weighing the turnout grinding tool to obtain an initial weight, measuring a height of the steel turnout rail to obtain an initial height, and collecting initial contour information of a designated position of the steel turnout rail;

S2, mounting the steel turnout rail, and adjusting, based on rotation of the fixing assembly of the turnout swinging unit relative to the angle adjusting mechanism, a position of the steel turnout rail, to thereby adjust the grinding angle of the steel turnout rail;

S3, obtaining, by the pressurizing unit, a monitoring result of a forward pressure; adjusting, based on the monitoring result of the forward pressure, the loading mechanism to set a load required for a rail grinding test;

S4, adjusting a rotating speed of the grinding tool rotary mechanism to ensure the turnout grinding tool rotating in a constant speed; adjusting a reciprocating speed of the reciprocating unit to ensure the rotary mechanism moving in a constant speed and constant distance; starting the pressurizing unit to keep the steel turnout rail in constant contact with the turnout grinding tool under a constant load; monitoring, by the temperature monitoring mechanism, temperatures of the steel turnout rail and the turnout grinding tool during the grinding process; turning off the loading mechanism after the grinding process is completed; and resetting the loading mechanism so that the turnout grinding tool is out of contact with the steel turnout rail and grinding is stopped;

S5, removing the turnout grinding tool after the rail grinding test is completed; weighing the turnout grinding tool; and calculating a mass loss and a volume loss of the turnout grinding tool;

S6, removing the steel turnout rail; measuring contour information of the steel turnout rail; calculating a rail grinding amount, and analyzing a grinding surface quality of the steel turnout rail;

S7, calculating, by combining a friction torque monitored by the torque sensor and the forward pressure monitored by the pressurizing unit during the grinding process, a friction coefficient and a total grinding force of an interface between the turnout grinding tool and the steel turnout rail during the grinding process; and S8, performing analysis on grinding performance of the turnout grinding tool by combining wear behavior of the grinding tool, the rail grinding amount, stress analysis of the turnout grinding tool during the grinding process, the temperature of the steel turnout rail during the grinding process and surface quality information of the steel turnout rail.

Compared with the related art, the grinding simulation test device for the steel turnout rail of rail transit provided by the disclosure disassembles four main influencing parameters originally combining to influence the turnout grinding tool, namely, moving speed, rotary speed, grinding angle and grinding pressure of a grinding tool, into four independent parameters through the reciprocating unit, the rotary unit, the turnout swinging unit and the pressurizing unit, thereby improving controllability and operability of each of the four independent parameters under laboratory conditions, optimizing disassembly and replacement processes of devices in related art and experimental materials, and improving test efficiency.

DESCRIPTION OF REFERENCE NUMERALS

Figure 1:
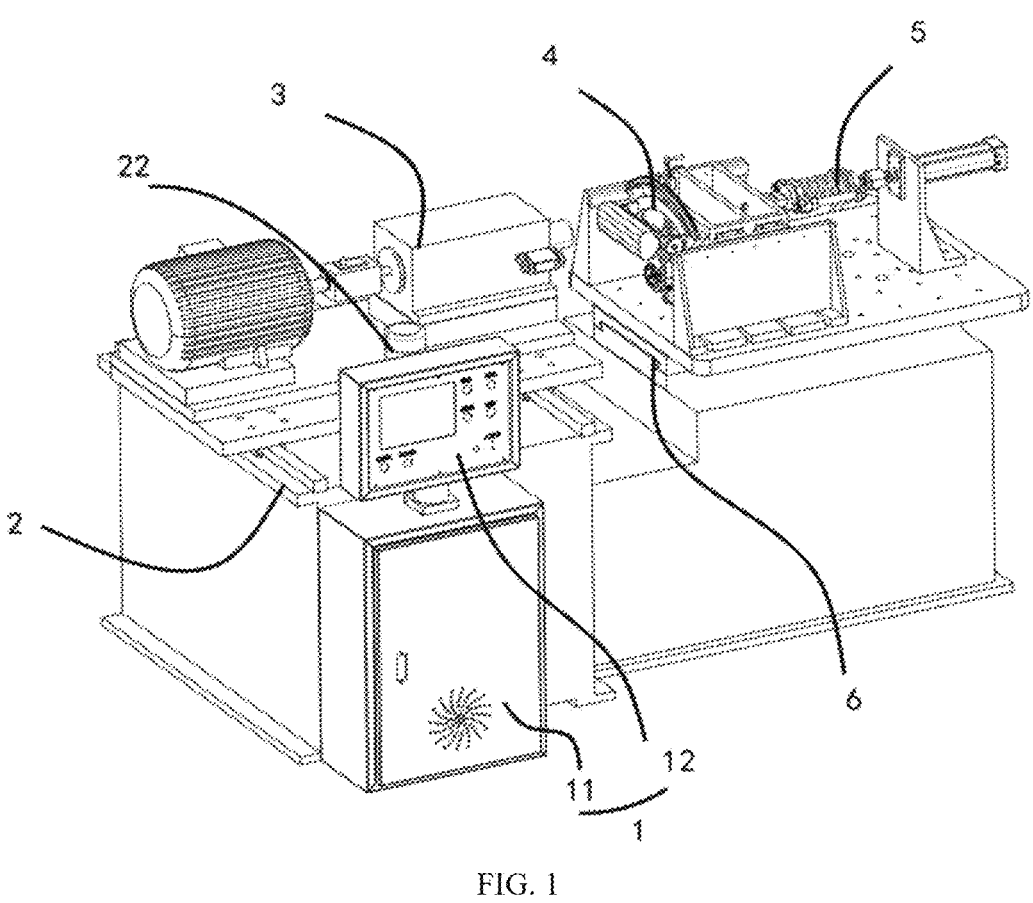
FIG. 1 illustrates a schematic overall perspective structural view of a grinding simulation test device for a steel turnout rail of rail transit according to an embodiment of the disclosure.
Figure 2:
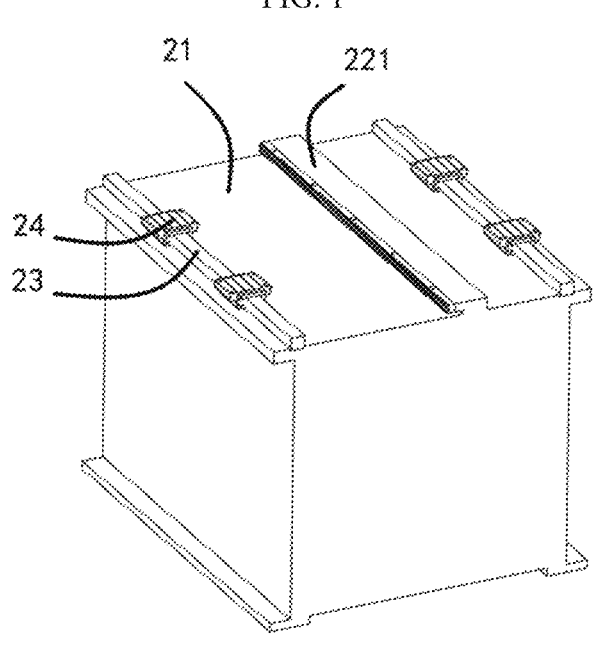
FIG. 2 illustrates a schematic perspective structural view of a reciprocating unit of the grinding simulation test device for the steel turnout rail of rail transit illustrated in the FIG. 1.
Figure 3:
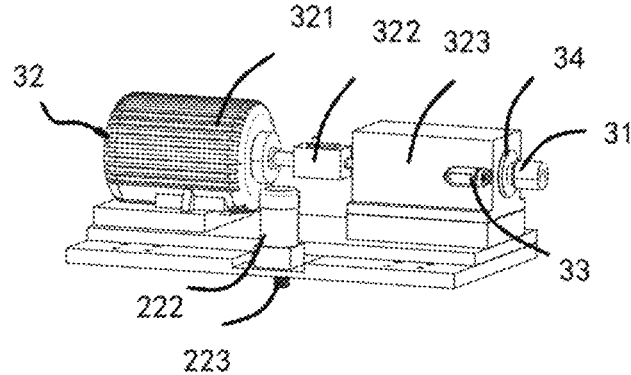
FIG. 3 illustrates a schematic perspective structural view of a rotary unit of the grinding simulation test device for the steel turnout rail of rail transit illustrated in the FIG. 1.

1: control unit; 11: host; 12: operation panel;
2: reciprocating unit; 21: first platform; 22: feed assembly; 221: feed rack; 222: feed motor; 223: feed gear; 23: slide rail; 24: slider;
3: rotary unit; 31: turnout grinding tool; 32: grinding tool rotary mechanism; 321: speed regulating motor; 322: torque sensor; 323: gearbox; 33: temperature monitoring mechanism; 34: grinding tool mounting plate;
4: turnout swinging unit; 41: angle adjusting mechanism; 411: adjusting assembly; 4111: steel rail frame support plate; 4112: swinging support frame; 4113: arc-shaped rack; 412: fixing assembly; 4121: steering rod; 4122: rack meshing block; 4123: steering handle; 4124: tension spring; 4125: spring fixing block; 413: motion steering assembly; 4131: first bevel gear; 4132: bevel gear support frame; 4133: first transmission rod; 4134: second bevel gear; 4135: second transmission rod; 4136: synchronous transmission structure; 4136a: first transmission gear; 4136b: third transmission rod; 4136c: synchronous belt; 4136d: fourth transmission rod; 4136c: second transmission gear; 42: steel rail frame; 43: steel rail pin; 44: steel turnout rail;
5: pressurizing unit; 51: loading mechanism; 511: servo electric cylinder; 512: floating joint; 513: support plate; 52: damping mechanism; 521: spring support frame; 522: damping spring; 523: guide rod; 524: pressure sensor; 525: through-hole; 53: guiding mechanism; 531: connecting seat; 532: guide rail slider; 533: support side plate; 534: linear guide rail; and
6: feeding unit; 61: second platform; 62: carriage mechanism; 621: lower carriage; 622: upper carriage; 63: longitudinal feeding mechanism; 631: ball screw mechanism; 632: third bevel gear; 633: fourth bevel gear; 634: transmission rod shaft seat; 635: feeding transmission rod; 636: feeding handwheel.

DETAILED DESCRIPTION OF EMBODIMENTS

To solve a technical problem of how to conveniently detect performance of a turnout grinding tool 31 and grinding quality of a steel turnout rail 44 and meet a need of simulation experiments in a laboratory, the disclosure provides a grinding simulation test device and a grinding simulation test method for a steel turnout rail of rail transit, therefore realizing convenient detect of performance of the turnout grinding tool 31 and grinding quality of the steel turnout rail 44 and meeting the need of simulation experiments in the laboratory.

It should be noted that, the grinding simulation test device for the steel turnout rail of rail transit is used but not limited to grind the steel turnout rail of rail transit. To simplify description, in the disclosure, only the grinding simulation test device for the steel turnout rail of rail transit being applied to grind the steel turnout rail of rail transit is taken as an example to specify the disclosure. Principles of the grinding simulation test device for the steel turnout rail of rail transit being applied to other types of equipment are substantively the same as that of the grinding simulation test device for the steel turnout rail of rail transit being applied to similar equipment, and will not be described here.

As illustrated in FIG. 1, FIG. 1 illustrates a schematic overall perspective structural view of the grinding simulation test device for the steel turnout rail of rail transit according to an embodiment of the disclosure. The grinding simulation test device for the steel turnout rail of rail transit includes a rotary unit 3, a reciprocating unit 2, a turnout swinging unit 4, and a pressurizing unit 5.

In the embodiment, the rotary unit 3 includes a grinding tool rotary mechanism 32, a temperature monitoring mechanism 33 and a turnout grinding tool 31. A movable end of the grinding tool rotary mechanism 32 is detachably connected to the turnout grinding tool 31 through a torque sensor 322, to thereby drive the turnout grinding tool 31 to rotate and monitor a torque. The temperature monitoring mechanism 33 is configured to monitor temperatures during a grinding process. A movable end of the reciprocating unit 2 is connected to the rotary unit 3, to thereby drive the rotary unit 3 to feed transversely. The turnout swinging unit 4 is disposed opposite to the rotary unit 3 and includes a steel rail frame 42 and an angle adjusting mechanism 41. The steel rail frame 42 is disposed on a movable end of the angle adjusting mechanism 41. The steel rail frame 42 is configured to mount the steel turnout rail 44. The angle adjusting mechanism 41 is configured to adjust a grinding angle of the steel turnout rail 44. A movable end of the pressurizing unit 5 is connected to the turnout swinging unit 4. The pressurizing unit 5 is configured to elastically push and output a load to provide a contact force between the steel turnout rail 44 and the turnout grinding tool 31 and monitor the contact force. Four main influencing parameters originally combining to influence the turnout grinding tool 31, namely, moving speed, rotary speed, grinding angle and grinding pressure of a grinding tool, are disassembled into four independent parameters through the reciprocating unit 2, the rotary unit 3, the turnout swinging unit 4 and the pressurizing unit 5, thereby improving controllability and operability of each of the four independent parameters under laboratory conditions, optimizing disassembly and replacement processes of devices in related art and experimental materials, and improving test efficiency.

In an embodiment, as illustrated in FIG. 1, the grinding simulation test device for the steel turnout rail of rail transit further includes a control unit 1. The control unit 1 is electrically connected to the reciprocating unit 2, the rotary unit 3, the turnout swinging unit 4, the pressurizing unit 5 and a feeding unit 6. The control unit 1 is configured to receive and transmit control signals, receive data, and control a running speed of the reciprocating unit 2, a rotating speed of the rotary unit 3 and a feeding speed of the pressurizing unit 5.

In an embodiment, the control unit 1 includes a host 11 and an operation panel 12. The host 11 is configured to collect a reciprocating displacement distance, a reciprocating displacement speed and grinding tool rotating speed of the rotary unit 3, collect a load pressure of the pressurizing unit 5 and collect a longitudinal moving distance of the feeding unit 6. The operation panel 12 is configured to perform visualized process on data collected by the host 11. The host 11 is configured to adjust and control the reciprocating displacement distance, the reciprocating displacement speed and the grinding tool rotating speed of the rotary unit 3, and adjust the load pressure of the pressurizing unit 5, to thereby realizing constant displacement distance, constant speed, constant rotating speed and constant load.

In an embodiment, the reciprocating unit 2 includes a first platform 21, a feed assembly 22, two slide rails 23 and two pairs of sliders 24. The feed assembly 22 and the two slide rails 23 are disposed on a top of the first platform. The two pairs of sliders 24 are slidably connected to the two slide rails 23. The two pairs of sliders 24 are connected to the rotary unit 3. A driving end of the feed assembly 22 is connected to the two pairs of sliders 24 to drive the two pairs of sliders 24 to slide along the two slide rails 23.

In an embodiment, the feed assembly 22 includes a feed rack 221, a feed motor 222 and a feed gear 223. The feed gear 223 is disposed on an output shaft of the feed motor 222. The feed gear 223 is disposed on the top of the first platform 21 and meshed with the feed rack 221. The feed motor 222 is disposed on the rotary unit 3. The feed rack 221 is disposed on the first platform 21 in parallel with the two slide rails 23 and is flush with a long side of the first platform 21, so as to ensure a stable and smooth movement of the rotary unit 3 in a transverse direction. Each pair of the two pairs of sliders 24 are disposed on a corresponding one of the two slide rails 23, and the two pairs of sliders 24 carry the rotary unit 3. The feed motor 222 rotates in a constant speed to drive the feed gear 223 to move on the feed rack 221, to thereby realizing the constant speed and the constant displacement distance of the rotary unit 3. The grinding tool rotary mechanism 32 includes a speed regulating motor 321, the torque sensor 322 and a gearbox 323. A left side of the torque sensor 322 is connected to an output shaft of the speed regulating motor 321, and a right side of the torque sensor 322 is connected to an input shaft of the gearbox 323. The torque sensor 322 is configured to monitor a change of a friction torque during the grinding process in real time. The speed regulating motor 321 can perform stepless speed regulation and maintain a constant rotating speed. A left side of a grinding tool mounting plate 34 is connected to the gearbox 323, and a right side of the grinding tool mounting plate 34 is connected to the turnout grinding tool 31. A power provided by the speed regulating motor 321 is transmitted to the turnout grinding tool 31 via the torque sensor 322, the gearbox 323 and the grinding tool mounting plate 34, to thereby drive the turnout grinding tool 31 to rotate in a regulatable constant speed. The temperature monitoring mechanism 33 is disposed on a side surface of the gearbox 323. Temperature measuring probes disposed on the temperature monitoring mechanism 33 aim at the turnout grinding tool 31 and grinding positions of the steel turnout rail 44, to thereby monitor temperature change during the grinding process in real time.

It should be noted that, in the embodiment, the turnout grinding tool 31 is a full-size grinding stone with a hollow cylindrical structure, and an end face of the full-size grinding stone forms a grinding surface, and at the same time, a scaled-down grinding stone may also be used as a sample. Apparently, in other embodiments, the turnout grinding tool 31 is not limited to grinding stones, but can also be grinding tools.

Figure 4:
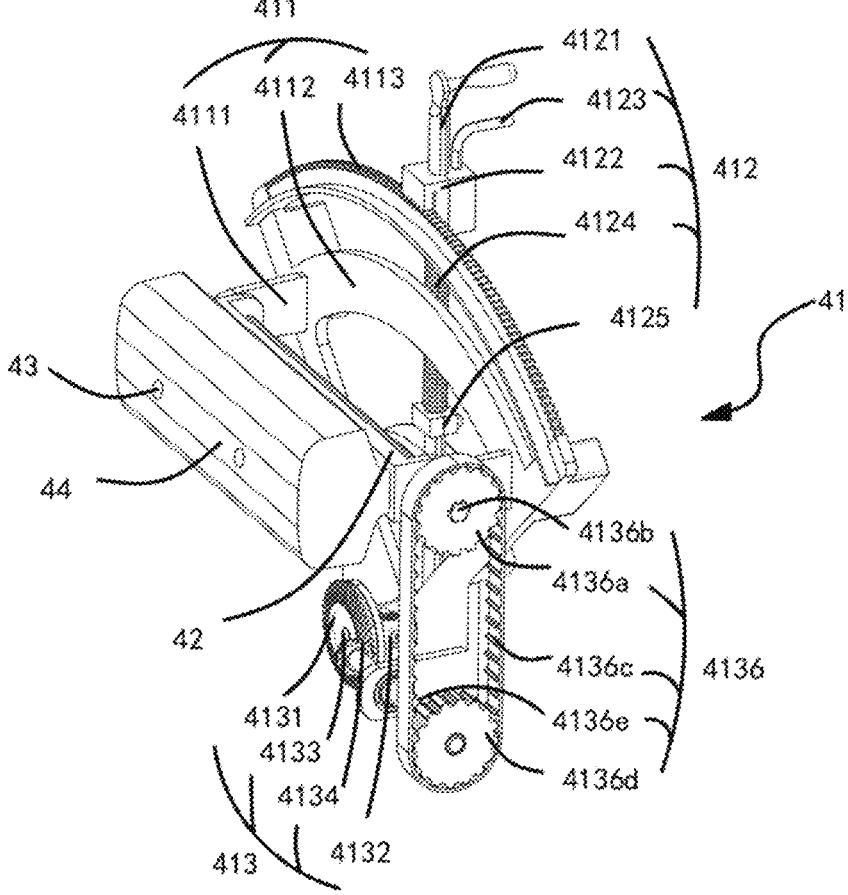
FIG. 4 illustrates a schematic perspective structural view of a turnout swinging unit of the grinding simulation test device for the steel turnout rail of rail transit illustrated in the FIG. 1.
Figures 5, 6:
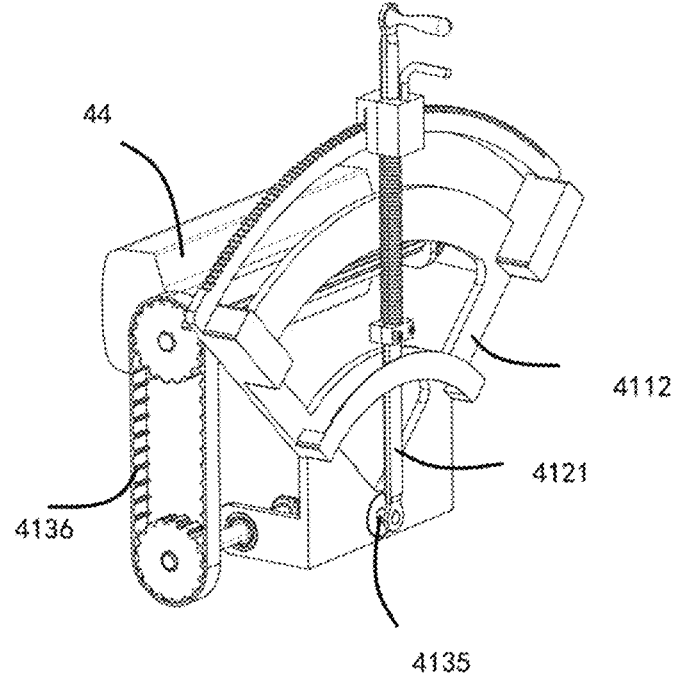
FIG. 5 illustrates a schematic perspective structural view of the turnout swinging unit of the grinding simulation test device for the steel turnout rail of rail transit illustrated in the FIG. 4 from a side view.
FIG. 6 illustrates a schematic perspective structural view of a pressurizing unit of the grinding simulation test device for the steel turnout rail of rail transit illustrated in the FIG. 1.

In an embodiment, as illustrated in FIG. 4 and FIG. 5, in the turnout swinging unit 4, the angle adjusting mechanism 41 includes an adjusting assembly 411, a fixing assembly 412 and a motion steering assembly 413. The adjusting assembly 411 includes steel rail frame support plates 4111, a swinging support frame 4112 and an arc-shaped rack 4113. The swinging support frame 4112 is connected to the steel rail frame support plates 4111. The steel rail frame 42 is rotatably connected to inner sides of the steel rail frame support plates 4111. The arc-shaped rack 4113 is disposed on a top of the swinging support frame 4112. The fixing assembly 412 includes a steering rod 4121, a rack meshing block 4122, a steering handle 4123, a tension spring 4124 and a spring fixing block 4125. The rack meshing block 4122 is sleeved on the steering rod 4121. A bottom of the steering rod 4121 is connected to the spring fixing block 4125. The steering handle 4123 is disposed on the rack meshing block 4122. An end of the tension spring 4124 is connected to the spring fixing block 4125, and another end of the tension spring 4124 is connected to the rack meshing block 4122. The steering rod 4121 is fixed on a second platform 61. The swinging support frame 4112 is fixed on a connecting seat 531. The steering rod 4121 is rotatably connected to the swinging support frame 4112. An input end of the motion steering assembly 413 is connected to the steering rod 4121, and an output end of the motion steering assembly 413 is connected to the steel rail frame 42. The motion steering assembly 413 is configured to rotate the steering rod 4121 and transmit rotation of the steering rod 4121 to the steel rail frame 42 to thereby drive the steel rail frame 42 to rotate.

In an embodiment, the motion steering assembly 413 includes a first bevel gear 4131, a bevel gear support frame 4132, a second bevel gear 4134, a first transmission rod 4133, a second transmission rod 4135 and a synchronous transmission structure 4136. The bevel gear support frame 4132 is connected to the swinging support frame 4112. The first transmission rod 4133 and the second transmission rod 4135 pass through the bevel gear support frame 4112. The second transmission rod 4135 is connected to the steering rod 4121. The first bevel gear 4131 is disposed on the bevel gear support frame 4132 and meshed with the second bevel gear 4134. An input end of the synchronous transmission structure 4136 is connected to the second bevel gear 4134, and an output end of the synchronous transmission structure is connected to the steel rail frame 42. The synchronous transmission structure 4136 is configured to transmit rotation of the second bevel gear 4134 to the steel rail frame 42 to thereby drive the steel rail frame 42 to rotate.

In an embodiment, the synchronous transmission structure 4136 includes a first transmission gear 4136a, a third transmission rod 4136b, a synchronous belt 4136c, a fourth transmission rod 4136d and a second transmission gear 4136c. The third transmission rod 4136b passes through the steel rail frame support plates 4111 and is connected to the first transmission gear 4136a. The third transmission rod 4136b is drivingly connected to the steel rail frame 42 to drive the steel rail frame 42 to rotate. The second transmission gear 4136e is connected to the fourth transmission rod 4136d and is connected to the first transmission gear 4136a through the synchronous belt 4136c. The second bevel gear 4134 is disposed on the fourth transmission rod 4136d.

Specifically, working principles of the adjusting assembly 411 and the fixing assembly 412 are as follows. By cooperation between the steering rod 4121 and the steering handle 4123, the steering handle 4123 is lifted to disengage the rack meshing block 4122. The steering rod 4121 is rotated to transmit rotation to the second transmission rod 4135, the bevel gear support frame 4132, the first transmission rod 4133, and the first bevel gear 4131 in turn. A direction of the rotation is changed through an engagement of the first bevel gear 4131 and the second bevel gear 4134. The rotation from the second bevel gear 4134 is transmitted to the fourth transmission rod 4136d, the second transmission gear 4136c, the synchronous belt 4136c, the first transmission gear 4136a and the third transmission rod 4136b in turn. The third transmission rod 4136b passes through bearing holes on the steel rail frame support plates 4111 and a spline hole on the steel rail frame 42. The steel rail frame 42 is driven by the third transmission rod 4136b to rotate. The steel turnout rail 44 is mounted on the steel rail frame 42. The steering handle 4123 is released after adjusting the steel turnout rail 44 to a required position, the tension spring 4124 contracts, and the rack meshing block 4122 and the arc-shaped rack 4113 are meshed again to fix the grinding angle, to thereby realize a purpose of rotating the steering rod 4121 to change a grinding contact angle of the steel turnout rail 44.

It should be noted that, the bevel gear support frame 4132 is a bevel gear differential gear set, and a housing of the bevel gear differential gear set is used as a support frame. A bevel gear at an internal input end of the bevel gear differential gear set is connected to the fourth transmission rod 4136d, and a bevel gear at an internal output end of the bevel gear differential gear set is connected to the first transmission rod 4133.

In an embodiment, transmission ratios between mutually meshed gear sets are all 1:1. A transmission ratio of the synchronous transmission structure is 1:1.

It should be noted that, an angle range of the arc-shaped rack 4113 includes 0 degree (°) to 90°, specifically, a grinding angle range of −15° to +70° for straight and curved rails, a grinding angle range of +3° to 70° for pointed rails with a width less than 20 millimeters (mm), and a grinding angle range of +3° to +40° for curved strand grinding short center rails and wing rails. An arc-shaped scale is disposed on a front side of the arc-shaped rack 4113, and perpendicular to the arc-shaped rack 4113. Scales of 0° to 90° are curved on the arc-shaped scale, helping to accurately adjust the required grinding angle.

In an embodiment, angle adjustment accuracy of the arc-shaped rack 4113 can be divided more accurately by adjusting numbers of teeth and modulus. The angle range of the arc-shaped rack 4113 can also be adjusted according to actual needs.

In an embodiment, as illustrated in FIG. 4 and FIG. 5, the steel turnout rail 44 is formed by cutting steel rail head part, and a removed part is not ground in an actual grinding operation to reduce a weight of mounted steel rail. In order to facilitate calculation of a grinding amount of the steel turnout rail 44 and analysis of quality of the steel turnout rail 44 after grinding, the turnout swinging unit 4 further includes steel rail pins 43. The steel turnout rail 44 defines counterbores on its rail surface. The counterbores are configured to install the steel rail pins 43. Lengths of the steel rail pins 43 should be less than or equal to depths of the counterbores. A bottom of the steel turnout rail 44 is drilled with threaded through-holes concentric with the counterbores. Bolts pass through clearance holes defined on the steel rail frame 42 and the threaded through-holes drilled on the steel turnout rail 44 to adjust the depths of the counterbores. During use, initial weights and initial heights of the steel rail pins 43 and a contour of the steel turnout rail 44 are firstly measured. The steel rail pins 43 are then installed and inserted into the counterbores of the steel turnout rail 44, and the bolts at a back of the steel turnout rail 44 are adjusted to adjust heights of end faces of the steel rail pins 43 to be consistent with the steel turnout rail 44. After the grinding process of the steel turnout rail 44 is completed, the contour of the steel turnout rail 44 is measured again. Subsequently, the steel rail pins 43 are removed from the counterbores, and weights and heights of the steel rail pins 43 after grinding are measured. In this way, the grinding amount of the steel turnout rail 44 can be calculated, and surface quality of the steel rail pins can be analyzed by microscopic analysis such as surface structure and metallographic structure.

In an embodiment, as illustrated in FIG. 6, the pressurizing unit 5 includes a loading mechanism 51, a damping mechanism 52 and a guiding mechanism 53. The loading mechanism 51 includes a floating joint 512, a servo electric cylinder 511 and a support plate 513. The servo electric cylinder 511 is disposed on the support plate 513. A driving rod of the servo electric cylinder 511 is connected to the support plate 513 and the floating joint 512 in turn. The servo electric cylinder 511 is configured to apply a pressure by telescopic movement of the driving rod. The loading mechanism is configured to apply a pressure to the turnout swinging unit 4 and provide load for the turnout grinding tool 31 and the steel turnout rail 44.

It should be noted that, the floating joint 512 is composed of two connectors, namely a fixed connector and a floating connector. The fixed connector is fixedly connected to a main structure, and the floating connector is connected to connectors and other equipment. A principle of the floating joint 512 is first to use flexible components, such as metal diaphragms, metal bellows, metal braided sleeves, etc., as compensation components between the fixed connector and the floating connector, to thereby withstand corresponding displacement and deformation and recover to an original position. These flexible components can be freely bent, rotated and compressed, thus providing a movement space between the fixed connector and the floating connector. Secondly, the floating joint 512 usually uses fixed connectors such as bolts or pins to firmly connect the fixed connector to the floating connector. These fixed connectors can be adjusted and fixed within a certain range to adapt to relative motion between the fixed connector and the floating connector.

In an embodiment, the damping mechanism 52 includes spring support frames 521, a damping spring 522, a guide rod 523 and a pressure sensor 524. The spring support frames 521 are two in quantity, and the two spring support frames 521 are connected to the loading mechanism 51 and the pressure sensor 524 respectively. The guide rod 523 is disposed in parallel with the damping spring 522 and passes through through-holes 525 defined on the two spring support frames 521. The damping mechanism 52 is configured to damp system vibration and maintain pressure during the grinding process of the steel turnout rail 44. During the grinding process, an elastic force of the damping spring 522 can not only provide a constant contact load, but also reduce vibration caused by rigid contact between the turnout grinding tool 31 and the steel turnout rail 44, thus ensuring stability of the grinding process. The guide rod 523 is configured to keep a compression direction of the damping spring 522 unchanged.

It should be noted that, the pressure sensor 524 is configured to transmit, by telescopic movement of a driving rod thereof, the pressure applied by the servo electric cylinder 511. The pressure sensor 524 is an S-type pressure sensor 524, and the S-type pressure sensor 524 can determine magnitude of the load and the pressure. The loading mechanism 51 is connected to the damping mechanism 52 through the floating joint 512. The floating joint 512 can solve a problem of different axes between the damping mechanism 52 and the loading mechanism 51, and reduce difficulty of installation. Moreover, a motion direction of the loading mechanism 51 is parallel to an axis of the turnout grinding tool 31 and a center of the steel turnout rail 44.

In addition, in the damping mechanism 52, numbers of the damping spring 522 and the guide rod 523 are not limited, and can be set according to an actual use situation, as long as the damping spring 522 and guide rod 523 are both parallel to the motion direction of the loading mechanism 51.

In an embodiment, the guiding mechanism 53 includes the connecting seat 531, guide rail sliders 532, linear guide rails 534 and support side plates 533. The connecting seat 531 is connected to the turnout swinging unit 4 through the pressure sensor 524. The linear guide rails 534 are two in quantity, the support side plates 533 are two in quantity, and the two linear guide rails 534 each are disposed on a corresponding one of the two support side plates 533 in parallel. The two support side plates 533 are disposed on the second platform 61. The connecting seat 531 is disposed on the guide rail sliders 532. The guide rail sliders 532 are slidably connected to the two linear guide rails 534. An upper end of each of the two support side plates 533 is provided with mounting steps and mounting holes. The two linear guide rails 534 are connected to the two support side plates 533 through the mounting steps and the mounting holes. The guide rail sliders 532 are fixedly connected to the connecting seat 531 and slidably mounted on the two linear guide rails 534, so that the connecting seat 531 can move along a direction of the two linear guide rails 534, and a one-way feeding movement of the steel turnout rail 44 during a pressurizing process is realized. In an embodiment, a moving direction of the damping mechanism 52, a sliding direction of the guide mechanism 53 and a pressurizing direction of the loading mechanism 51 are all the same and parallel to the axis of the turnout grinding tool 31, so that the pressure sensor 524 can detect the load with forward pressure.

Figure 7:
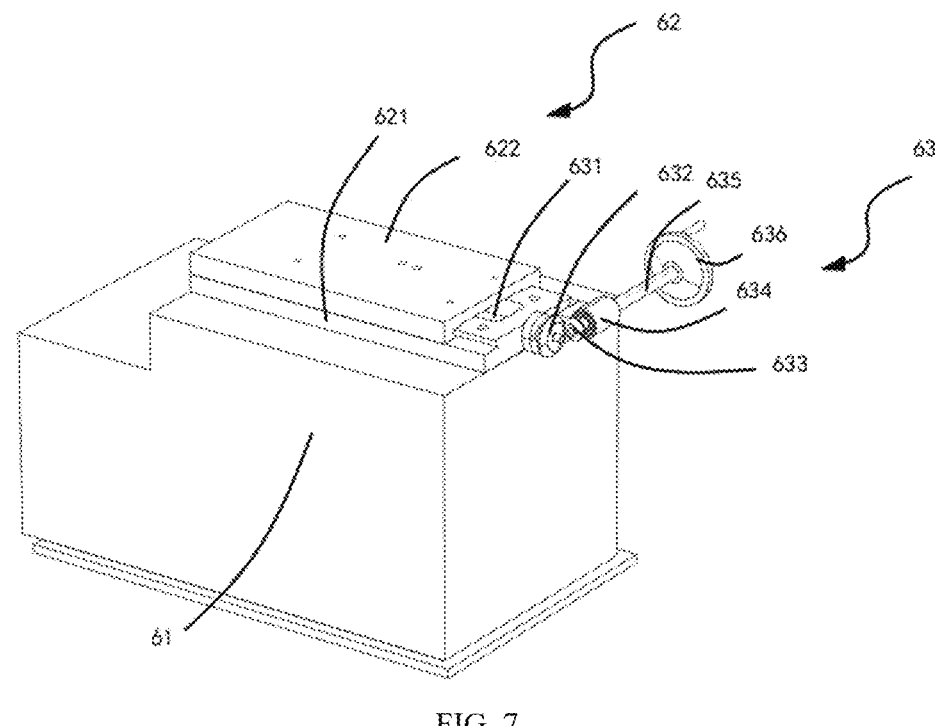
FIG. 7 illustrates a schematic perspective structural view of a feeding unit of the grinding simulation test device for the steel turnout rail of rail transit illustrated in the FIG. 1.

In an embodiment, as illustrated in FIG. 7, the grinding simulation test device for the steel turnout rail of rail transit further includes the feeding unit 6. The feeding unit 6 includes the second platform 61, a carriage mechanism 62 and a longitudinal feeding mechanism 63. The carriage mechanism 62 is disposed on the second platform 61 and connected to the pressurizing unit 5. A movable end of the longitudinal feeding mechanism 63 is connected to the turnout swinging unit 4 and the pressurizing unit 5 to drive the turnout swinging unit 4 and the pressurizing unit 5 to feed longitudinally. The feeding unit 6 is configured to adjust initial positions of the turnout grinding tools 31 and the steel turnout rail 44. The second platform 61 is configured to install and fix the carriage mechanism 62. The carriage mechanism 62 includes a lower carriage 621 and an upper carriage 622. The lower carriage 621 is installed and fixed on the second platform 61. A dovetail structure is disposed on the lower carriage 621 to match with a dovetail groove defined on the upper carriage 622. The longitudinal feeding mechanism 63 includes a ball screw mechanism 631, a third bevel gear 632, a fourth bevel gear 633, a transmission rod shaft seat 634, a feeding transmission rod 635 and a feeding handwheel 636. The transmission rod shaft seat 634 is installed and fixed on the second platform 61. the feeding transmission rod 635 passes through the transmission rod shaft seat 634. The feeding handwheel 636 is disposed on an end of the feeding transmission rod 635, and the fourth bevel gear 633 is disposed on another and of the feeding transmission rod 635. The ball screw mechanism 631 passes through the lower carriage 621 to be connected to the upper carriage 622. A rotation is transmitted, by rotating the feeding handwheel 636, to the feeding transmission rod 635, the fourth bevel gear 633, the third bevel gear 632, the ball screw mechanism 631 and the upper carriage 622 in turn. The initial positions of the turnout grinding tool 31 and the steel turnout rail 44 are adjusted by adjusting a relative position of the upper carriage 622 relative to the lower carriage 621.

It should be noted that, the longitudinal feeding mechanism 63 can be set according to the actual use situation, and can be adjusted to have a function of adjusting a longitudinal initial distance and an initial height of the upper carriage 622.

Aforementioned embodiments are only various possible implementations of embodiments of the disclosure, and the embodiments of the disclosure are not limited thereto.

The grinding simulation test method for the steel turnout rail of rail transit provided by the disclosure and applied to any one of grinding simulation test devices for the steel turnout rail of rail transit provided by the aforementioned embodiments, includes the following step 1 through step 8.

Step 1, a rail head part of the steel turnout rail 44 is cut as a steel rail sample. Initial weights of the turnout grinding tool 31 and the steel turnout rail 44 is measured by an electronic balance. Initial contour information of designated positions of the turnout grinding tool 31 and the steel turnout rail 44 are measured by a profilometer. The initial weights and the initial heights of the steel rail pins 43 are measured.

Step 2, the steel rail pins 43 are installed on the steel turnout rail 44. The bolts at the back of the steel turnout rail 44 are adjusted to keep the initial heights of the steel rail pins 43 to be consistent with the steel turnout rail 44. The turnout grinding tool 31 is installed on the grinding tool mounting plate 34. The steel turnout rail 44 is installed on the steel rail frame 42. The feeding handwheel 636 is adjusted to make the turnout grinding tool 31 and the steel turnout rail 44 reach a proper initial distance. The steering handle 4123 is lifted, the steering rod 4121 is rotated to the required position, then the steering handle 4123 is released to make the rack meshing block 4122 being meshed and fixed to the arc-shaped rack 4113.

Step 3, a monitoring result of a forward pressure is obtained by the pressure sensor 524. The loading mechanism 51 is adjusted to set a load required for a rail grinding test based on the monitoring result of the forward pressure.

Step 4, a rotating speed of the grinding tool rotary mechanism 32 is adjusted to a required rotating speed to ensure the turnout grinding tool 31 rotating in a constant speed. The feed motor 222 is adjusted to set a transverse displacement length and a transverse displacement speed. The servo electric cylinder 511 is started to push the driving rod of the servo electric cylinder 511 out, to thereby keep the steel turnout rail 44 in constant contact with the turnout grinding tool 31 under a constant load. Temperatures of the steel turnout rail 44 and the turnout grinding tool 31 during the grinding process are monitored by the temperature monitoring mechanism. The servo electric cylinder 511 is turned off after the grinding process is completed, to thereby retract the driving rod of the servo electric cylinder 511. The grinding tool rotary mechanism 32 stops rotating, and the feeding motor 222 stops rotating. The turnout grinding tool 31 is out of contact with the steel turnout rail 44, and grinding is stopped.

Step 5, the turnout grinding tool 31 is removed after the rail grinding test is completed. A weight of the turnout grinding tool 31 is weighed. A mass loss and a volume loss of the turnout grinding tool 31 are calculated. The contour information of the designated position of the steel turnout rail 44 is measured. Weights and heights of the steel rail pins 43 are measured. A mass loss and a volume loss of the steel turnout rail 44 are calculated.

Step 6, a surface morphology of the turnout grinding tool 31 after grinding is detected, and wear behavior of the turnout grinding tool 31 is analyzed. Meanwhile, grinding quality of the steel rail pins 43 is analyzed. Measurement of the contour information of the turnout grinding tool 31 and the steel turnout rail 44 after grinding is the same as that in the step 1.

Step 7, a friction coefficient and a total grinding force of an interface between the turnout grinding tool 31 and the steel turnout rail 44 during the grinding process are calculated by combining the friction torque monitored by the torque sensor and the forward pressure monitored by pressurizing unit during the grinding process.

Step 8, technical research on steel turnout rail grinding as well as performance testing and product development of the turnout grinding wheel 31 are performed by combining the rotating speed of the turnout grinding wheel 31, the transverse displacement speed, stress analysis of the turnout grinding tool 31 during the grinding process, the temperature of the steel turnout rail 44 during the grinding process, the wear behavior of the turnout grinding tool 31, and the grinding amount and surface quality information of the steel turnout rail 44.

The disclosure overcomes a defect that the rail grinding test and grinding stone performance test carried out by the turnout grinding devices in the related art are significantly influenced by manual operation. By disposing the rotary unit 3, the turnout swinging unit 4 and the pressurizing unit 5, the disclosure realizes stable adjustment of moving speed, moving distance, rotating speed of the grinding tool, the grinding angle and a grinding load.

By disposing the reciprocating unit 2, the rotary unit 3, the turnout swinging unit 4 and the pressurizing unit 5, the disclosure disassembles the four main influencing parameters originally combining to influence the turnout grinding tool 31, namely, the moving speed, the rotary speed, the grinding angle and the grinding pressure of the grinding tool, into four independent parameters, thereby improving the controllability and operability of each of the four independent parameters under the laboratory conditions, optimizing the disassembly and replacement processes of devices in related art and experimental materials, and improving the test efficiency.

By disposing the reciprocating unit 2, the feed motor 222 is used to realize constant speed and constant displacement to instead manual pushing forward; to thereby eliminate problems of inconsistent and unstable moving speed and different moving distances caused by manual pushing.

By disposing the turnout swinging unit 4, a method in related art of adjusting a contact angle by swinging the grinding tool is transformed into adjusting the contact angle by swinging a steel rail. In this way, composite parameters influencing the grinding tool are disassembled into independent parameters, thereby simplifying an equipment structure and improving convenience of material replacement.

By disposing the pressurizing unit 5, the servo electric cylinder 511 is used to provide a stable load, and the damping mechanism 52 is used to keep stable contact between the turnout grinding tool 31 and the steel turnout rail 44. This design eliminates instability and poor repeatability caused by manual loading, making pressure adjustment simpler, more efficient, and precise.

In the disclosure, the moving speed, the moving distance, the rotary speed of the grinding tool, a contact angle of a turnout, and the grinding load can be freely adjusted to refine testable parameters, therefore facilitating more efficiently optimizing grinding parameters and testing performance of the turnout grinding tool 31 and improving exploratory capability and reliability of laboratory simulations The disclosure can perform grinding pressure monitoring, grinding tool rotating speed monitoring, friction torque monitoring and grinding temperature monitoring in real time in the rail grinding test. A systematic data frame is formed through various types of data collection. The disclosure compares and analyzes data collected with rail grinding evaluation indexes such as grinding depth, grinding force, wear rate, friction coefficient, grinding ratio and rail surface quality to provide reliable support for the technical research on steel turnout rail grinding and the performance testing and product development of the turnout grinding tool 31.

The aforementioned embodiments of the disclosure do not limit a scope of protection of the disclosure. Any other corresponding changes and deformations made according to technical concepts of the disclosure shall fall within the scope of protection of the disclosure claimed by the claims.

What is claimed is:

1. A grinding simulation test device for a steel turnout rail of rail transit, comprising:

a rotary unit, comprising a grinding tool rotary mechanism, a temperature monitoring mechanism and a turnout grinding tool; wherein a movable end of the grinding tool rotary mechanism is detachably connected to the turnout grinding tool through a torque sensor, to thereby drive the turnout grinding tool to rotate and monitor a torque; and the temperature monitoring mechanism is configured to monitor temperatures during a grinding process;

a reciprocating unit, wherein a movable end of the reciprocating unit is connected to the rotary unit, to thereby drive the rotary unit to feed transversely;

a turnout swinging unit, disposed opposite to the rotary unit, wherein the turnout swinging unit comprises a steel rail frame and an angle adjusting mechanism, the steel rail frame is disposed on a movable end of the angle adjusting mechanism, the steel rail frame is configured to mount the steel turnout rail, and the angle adjusting mechanism is configured to adjust a grinding angle of the steel turnout rail; and a pressurizing unit, wherein a movable end of the pressurizing unit is connected to the turnout swinging unit, and the pressurizing unit is configured to elastically push and output a load to provide a contact force between the steel turnout rail and the turnout grinding tool and monitor the contact force; and wherein the angle adjusting mechanism comprises an adjusting assembly, a fixing assembly and a motion steering assembly;

the adjusting assembly comprises steel rail frame support plates, a swinging support frame and an arc-shaped rack; the swinging support frame is connected to the steel rail frame support plates, the steel rail frame is rotatably connected to inner sides of the steel rail frame support plates, and the arc-shaped rack is disposed on a top of the swinging support frame;

the fixing assembly comprises a steering rod, a rack meshing block, a steering handle, a tension spring and a spring fixing block; the rack meshing block is sleeved on the steering rod, a bottom of the steering rod is connected to the spring fixing block, the steering handle is disposed on the rack meshing block, an end of the tension spring is connected to the spring fixing block, another end of the tension spring is connected to the rack meshing block, and the steering rod is rotatably connected to the swinging support frame; and an input end of the motion steering assembly is connected to the steering rod, an output end of the motion steering assembly is connected to the steel rail frame, and the motion steering assembly is configured to rotate the steering rod and transmit rotation of the steering rod to the steel rail frame to thereby drive the steel rail frame to rotate.

2. The grinding simulation test device for the steel turnout rail of rail transit as claimed in claim 1, wherein the reciprocating unit comprises a first platform, a feed assembly, slide rails and sliders; the feed assembly and the slide rails are disposed on a top of the first platform; the sliders are slidably connected to the slide rails; the sliders are connected to the rotary unit; and a driving end of the feed assembly is connected to the sliders to drive the sliders to slide along the slide rails.

3. The grinding simulation test device for the steel turnout rail of rail transit as claimed in claim 2, wherein the feed assembly comprises a feed rack, a feed motor and a feed gear; the feed gear is disposed on an output shaft of the feed motor, the feed gear is disposed on the top of the first platform and meshed with the feed rack, and the feed motor is disposed on the sliders.

4. The grinding simulation test device for the steel turnout rail of rail transit as claimed in claim 3, comprising a feeding unit; wherein the feeding unit comprises a second platform, a carriage mechanism and a longitudinal feeding mechanism; the carriage mechanism is disposed on the second platform and connected to the pressurizing unit; a movable end of the longitudinal feeding mechanism is connected to the turnout swinging unit and the pressurizing unit to drive the turnout swinging unit and the pressurizing unit to feed longitudinally.

5. The grinding simulation test device for the steel turnout rail of rail transit as claimed in claim 4, further comprising a control unit, wherein the control unit is electrically connected to the reciprocating unit, the rotary unit, the turnout swinging unit, the pressurizing unit and the feeding unit; and the control unit is configured to receive and transmit control signals, receive data, and control a running speed of the reciprocating unit, a rotating speed of the rotary unit and a feeding speed of the pressurizing unit.

6. The grinding simulation test device for the steel turnout rail of rail transit as claimed in claim 5, wherein the pressurizing unit comprises a loading mechanism, a damping mechanism and a guiding mechanism;

wherein the loading mechanism comprises a floating joint, a servo electric cylinder and a support plate; the servo electric cylinder is disposed on the support plate, a driving rod of the servo electric cylinder is connected to the support plate and the floating joint in turn, and the servo electric cylinder is configured to apply a pressure by telescopic movement of the driving rod;

the damping mechanism comprises spring support frames, a damping spring, a guide rod and a pressure sensor; the spring support frames are two in quantity, and the two spring support frames are connected to the loading mechanism and the pressure sensor respectively; and the guide rod is disposed in parallel with the damping spring and passes through through-holes defined on the two spring support frames; and the guiding mechanism comprises a connecting seat, guide rail sliders, linear guide rails and support side plates; the connecting seat is connected to the turnout swinging unit through the pressure sensor; the linear guide rails are two in quantity, the support side plates are two in quantity, and the two linear guide rails each are disposed on a corresponding one of the two support side plates in parallel; the two support side plates are disposed on the second platform, the connecting seat is disposed on the guide rail sliders; and the guide rail sliders are slidably connected to the two linear guide rails.

7. The grinding simulation test device for the steel turnout rail of rail transit as claimed in claim 6, wherein the swinging support frame is fixed on the connecting seat.

8. The grinding simulation test device for the steel turnout rail of rail transit as claimed in claim 7, wherein the motion steering assembly comprises a first bevel gear, a bevel gear support frame, a second bevel gear, a first transmission rod, a second transmission rod and a synchronous transmission structure; the bevel gear support frame is connected to the swinging support frame, the first transmission rod and the second transmission rod pass through the bevel gear support frame, the second transmission rod is connected to the steering rod, the first bevel gear is disposed on the bevel gear support frame and meshed with the second bevel gear, an input end of the synchronous transmission structure is connected to the second bevel gear, an output end of the synchronous transmission structure is connected to the steel rail frame, and the synchronous transmission structure is configured to transmit rotation of the second bevel gear to the steel rail frame to thereby drive the steel rail frame to rotate.

9. The grinding simulation test device for the steel turnout rail of rail transit as claimed in claim 8, wherein the synchronous transmission structure comprises a first transmission gear, a third transmission rod, a synchronous belt, a fourth transmission rod and a second transmission gear; the third transmission rod passes through the steel rail frame support plates and is connected to the first transmission gear, the third transmission rod is drivingly connected to the steel rail frame to drive the steel rail frame to rotate; the second transmission gear is connected to the fourth transmission rod and is connected to the first transmission gear through the synchronous belt, and the second bevel gear is disposed on the fourth transmission rod.

10. A grinding simulation test method for a steel turnout rail of rail transit, applied to the grinding simulation test device for the steel turnout rail of rail transit as claimed in claim 9, comprising the following steps:

S1, weighing the turnout grinding tool to obtain an initial weight, measuring a height of the steel turnout rail to obtain an initial height, and collecting initial contour information of a designated position of the steel turnout rail;

S2, mounting the steel turnout rail, and adjusting, based on rotation of the fixing assembly of the turnout swinging unit relative to the angle adjusting mechanism, a position of the steel turnout rail, to thereby adjust the grinding angle of the steel turnout rail;

S3, obtaining, by the pressurizing unit, a monitoring result of a pressure applied by the servo electric cylinder; adjusting, based on the monitoring result of the pressure applied by the servo electric cylinder, the loading mechanism to set a load required for a rail grinding test;

S4, adjusting a rotating speed of the grinding tool rotary mechanism to ensure the turnout grinding tool rotating in a constant speed; adjusting the feed motor to set a transverse displacement length and a transverse displacement speed to thereby ensure the rotary unit moving in the transverse displacement length and the transverse displacement speed; starting the pressurizing unit to keep the steel turnout rail in constant contact with the turnout grinding tool under a constant load;

monitoring, by the temperature monitoring mechanism, a temperature of the steel turnout rail and a temperature of the turnout grinding tool during the grinding process; turning off the loading mechanism after the grinding process is completed; and resetting the loading mechanism so that the turnout grinding tool is out of contact with the steel turnout rail and grinding is stopped;

S5, removing the turnout grinding tool after the rail grinding test is completed; weighing the turnout grinding tool; and calculating a mass loss and a volume loss of the turnout grinding tool;

S6, removing the steel turnout rail, measuring contour information of the steel turnout rail, calculating a rail grinding amount, and analyzing wear behavior of the turnout grinding tool and a grinding surface quality of the steel turnout rail;

S7, calculating, by combining a friction torque monitored by the torque sensor and the pressure applied by the servo electric cylinder monitored by the pressurizing unit during the grinding process, a friction coefficient and a total grinding force of an interface between the turnout grinding tool and the steel turnout rail during the grinding process; and S8, performing analysis on grinding performance of the turnout grinding tool by combining the wear behavior of the turnout grinding tool, the rail grinding amount, the total grinding force of the interface between the turnout grinding tool and the steel turnout rail during the grinding process, the temperature of the steel turnout rail during the grinding process and surface quality information of the steel turnout rail.

* * * * *